US010607313B2

(12) United States Patent
Jenny

(10) Patent No.: US 10,607,313 B2
(45) Date of Patent: *Mar. 31, 2020

(54) SYSTEMS AND METHODS FOR GENERATING STABILIZED VISUAL CONTENT USING SPHERICAL VISUAL CONTENT

(71) Applicant: GoPro, Inc., San Mateo, CA (US)

(72) Inventor: Alexandre Jenny, Challes les eaux (FR)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/924,932

(22) Filed: Mar. 19, 2018

(65) Prior Publication Data

US 2018/0211359 A1   Jul. 26, 2018

Related U.S. Application Data

(63) Continuation of application No. 15/199,865, filed on Jun. 30, 2016, now Pat. No. 9,922,398.

(51) Int. Cl.
*G06T 17/00*  (2006.01)
*G06T 3/00*   (2006.01)
(Continued)

(52) U.S. Cl.
CPC .............. *G06T 3/005* (2013.01); *G06T 7/20* (2013.01); *G06T 2207/10032* (2013.01);
(Continued)

(58) Field of Classification Search
CPC .. H04N 5/23248–23277; G06T 3/0062; G06T 2207/20201; G06T 2207/30241
See application file for complete search history.

(56) References Cited

U.S. PATENT DOCUMENTS 6,654,019 B2   11/2003   Gilbert
8,022,948 B2    9/2011   Garbow
(Continued)

FOREIGN PATENT DOCUMENTS

WO   2009047572 A1   4/2009
WO   2014042104 A1   3/2014
WO   2014090277 A1   6/2014

OTHER PUBLICATIONS

Kopf et al., "First-person Hyper-Lapse Videos" ACM Transactions on Graphics (Proceedings of SIGGRAPH 2014), 33(4), Article No. 78, 2014 (10 pages).
(Continued)

*Primary Examiner* — Brian Werner
(74) *Attorney, Agent, or Firm* — Esplin & Associates, PC

(57) ABSTRACT

Spherical visual content represented in an image space may be obtained. The spherical visual content may have been captured by image sensor(s) during a time duration. The spherical visual content may include phenomena caused by motion of the image sensor(s) and/or optical components that guide light onto the image sensor(s). A capture path taken by the image sensor(s) during the time duration may be determined. The capture path may reflect positions and orientations of the image sensor(s) during the time duration. A smoothed path may be determined based on the capture path. The smoothed path may have smoother changes in positions and/or orientations than the capture path. The image space may be warped based on a difference between the capture path and the smoothed path. The stabilized visual content may be determined by projecting the spherical visual content represented in the warped image space to a spherical projection space.

20 Claims, 13 Drawing Sheets

(51) Int. Cl.
*G06T 7/20* (2017.01)
*H04N 5/232* (2006.01)

(52) U.S. Cl.
CPC .............. *G06T 2207/30241* (2013.01); *G06T 2207/30244* (2013.01); *G06T 2207/30252* (2013.01); *H04N 5/23248* (2013.01)

(56) References Cited

U.S. PATENT DOCUMENTS

| | | |
|---|---|---|
| 8,237,787 B2 | 8/2012 | Hollinger |
| 9,144,714 B2 | 9/2015 | Hollinger |
| 9,279,983 B1 | 3/2016 | Davis |
| 9,363,569 B1 | 6/2016 | Van Hoff |
| 9,374,532 B2 | 6/2016 | Grundmann |
| 9,426,430 B2 | 8/2016 | Aguilar |
| 9,787,902 B1 | 10/2017 | Beysserie |
| 10,262,691 B1 | 4/2019 | Gilmour |
| 10,284,794 B1 | 5/2019 | Francois |
| 10,341,564 B1 | 7/2019 | Derbanne |
| 10,432,864 B1 | 10/2019 | Douady |
| 2003/0160862 A1 | 8/2003 | Charlier |
| 2003/0210327 A1 | 11/2003 | Mory |
| 2004/0010804 A1 | 1/2004 | Hendricks |
| 2004/0125133 A1 | 7/2004 | Pea |
| 2006/0291841 A1 | 12/2006 | Fukumoto |
| 2009/0278917 A1 | 11/2009 | Dobbins |
| 2010/0277617 A1 | 11/2010 | Hollinger |
| 2010/0281375 A1 | 11/2010 | Pendergast |
| 2010/0299630 A1 | 11/2010 | McCutchen |
| 2011/0013778 A1 | 1/2011 | Takumai |
| 2011/0242352 A1 | 10/2011 | Hikosaka |
| 2012/0206565 A1 | 8/2012 | Villmer |
| 2013/0002813 A1 | 1/2013 | Vaught |
| 2013/0058535 A1 | 3/2013 | Othmezouri |
| 2013/0177168 A1 | 7/2013 | Inha |
| 2013/0210563 A1 | 8/2013 | Hollinger |
| 2013/0250047 A1 | 9/2013 | Hollinger |
| 2013/0329132 A1 | 12/2013 | Tico |
| 2014/0028876 A1 | 1/2014 | Mills |
| 2014/0039884 A1 | 2/2014 | Wei-ge |
| 2014/0266773 A1 | 9/2014 | Aguilar |
| 2014/0267586 A1 | 9/2014 | Aguilar |
| 2014/0267590 A1 | 9/2014 | McClatchie |
| 2015/0146014 A1 | 5/2015 | Black |
| 2015/0159846 A1 | 6/2015 | Hollinger |
| 2015/0350548 A1 | 12/2015 | Beysserie |
| 2016/0006935 A1 | 1/2016 | Zhou |
| 2016/0360109 A1 | 12/2016 | Laroia |
| 2017/0041545 A1 | 2/2017 | Murgia |
| 2017/0070689 A1 | 3/2017 | Silverstein |
| 2017/0084086 A1 | 3/2017 | Pio |
| 2017/0085964 A1 | 3/2017 | Chen |
| 2017/0094169 A1 | 3/2017 | Yoshikawa |
| 2017/0142337 A1 | 5/2017 | Kokaram |
| 2017/0289454 A1 | 10/2017 | Pettersson |
| 2017/0359534 A1 | 12/2017 | Li |
| 2018/0041705 A1 | 2/2018 | Wakamatsu |
| 2018/0048821 A1 | 2/2018 | Segapelli |
| 2018/0199025 A1 | 7/2018 | Holzer |
| 2018/0220073 A1 | 8/2018 | Keal |
| 2018/0324358 A1 | 11/2018 | Yamada |
| 2019/0124267 A1 | 4/2019 | Haruna |

OTHER PUBLICATIONS

PCT International Search Report and Written Opinion for PCT/US15/38913, dated Sep. 29, 2015, 15 Pages.

O'Donovan, A., et al., "Audio-Visual Panoramas and Spherical Audio Analysis using the Audio Camera," C1 Proceedings of the 16th International Conference on Auditory Display, Jun. 9-15, 2010, pp. ICAD-167-ICAD-168, can be retrieved at <URL: https://smartech.gatech.edu/bitstream/handle/1853/49858/0%27DonovanDuraiswami201 O.pdf?sequence=1 >.

O'Donovan, A., et al., "Real Time Capture of Audio Images and their Use with Video," 2007 IEEE Workshop on Applications of Signal Processing to Audio and Acoustics, Oct. 21-24, 2007, pp. 10-13.

"Spatial Audio Lecture Series," Regents of the University of California at Berkeley, Center for New Music and Audio Technologies, 2015, 1 Page, [online] [retrieved on Aug. 20, 2015] Retrieved from the internet <URL:http:l/cnmat.berkelev.edu/spatialaudiolectures>.

United States Office Action, U.S. Appl. No. 14/789,706, dated Jun. 7, 2016, ten pages.

Kamali et al., "Stabilizing Omnidirectional Videos Using 3D Structure and Spherical Image Warping", MVA2011 IAPR Conference on Machine Vision Applications, Jun. 13-15, 2011, Nara, Japan, pp. 177-180. (Year: 2011).

International Search Report and Written Opinion for Application No. PCT/US2019/020241, dated Jun. 3, 2019, 12 pages.

International Search Report and Written Opinion for Application No. PCT/US2019/031591, dated Jun. 18, 2019, 7 pages.

International Search Report for Application No. PCT/US19/48368, dated Nov. 7, 2019, 10 pages.

International Search Report and Written Opinion for Application No. PCT/US2019/048292, dated Sep. 27, 2019, 7 pages.

SYSTEMS AND METHODS FOR GENERATING STABILIZED VISUAL CONTENT USING SPHERICAL VISUAL CONTENT

FIELD

This disclosure relates to systems and methods that generate stabilized visual content using spherical visual content.

BACKGROUND

Video applications may allow a user to increase the playback speed of a video. The image sensor(s) that captured the video may have been moving during the capture of the video. Movement of the image sensor(s) during the capture of the video may cause sped-up playback of the video to appear jerky/shaky.

SUMMARY

This disclosure relates to generating stabilized visual content using spherical visual content. The spherical visual content may be obtained. The spherical visual content may include pixels represented in an image space. The spherical visual content may have been captured by image sensor(s) during a time duration. The spherical visual content may include phenomena caused by motion of the image sensor(s) and/or optical components that guide light onto the image sensor(s) during at least a part of the time duration. A capture path taken by the image sensor(s) during the time duration may be determined. The capture path may reflect positions and orientations of the image sensor(s) during the time duration. The capture path may include capture viewpoints from which the image sensor(s) captured the visual content during the time duration. A smoothed path may be determined based on the capture path. The smoothed path may have smoother changes in positions and/or orientations than the capture path. The smoothed path may include smoothed viewpoints. The image space may be warped based on a difference between the capture path and the smoothed path. The stabilized visual content may be determined by projecting the spherical visual content represented in the warped image space to a spherical projection space. Presentation of the stabilized visual content on a display may be effectuated.

A system that generates stabilized visual content using spherical visual content may include one or more physical processors, and/or other components. The one or more physical processors may be configured by machine-readable instructions. Executing the machine-readable instructions may cause the one or more physical processors to facilitate generating stabilized visual content using spherical visual content. The machine-readable instructions may include one or more computer program components. The computer program components may include one or more of a spherical visual content component, a capture path component, a smoothed path component, a warp component, a stabilized visual content component, a display component, and/or other computer program components.

The spherical visual content component may be configured to obtain spherical visual content. Spherical visual content may include visual content obtained by a spherical capture. Visual content may refer to media content that may be observed visually. Visual content may include one or more of an image, a sequence of images, a frame of a video, a video, and/or other visual content.

Spherical visual content may have been captured by image sensor(s) during a time duration. In some implementations, the image sensor(s) may be carried by an unmanned aerial vehicle. The spherical visual content may include phenomena caused by motion of the image sensor(s) and/or optical components that guide light onto the image sensor(s) during at least a part of the time duration. The spherical visual content may include pixels represented in an image space. The image space may include a projection point inside the image space. In some implementations, the projection point may coincide with a center of the spherical visual content represented in the image space. The spherical visual content may be transformed into a spherical projection space by projecting the pixels in the image space to the spherical projection space along lines including the projection point.

The capture path component may be configured to determine a capture path taken by the image sensor(s) during the time duration. The capture path may reflect positions and orientations of the image sensor(s) during the time duration. The capture path may include capture viewpoints from which the image sensor(s) captured the spherical visual content during the time duration. The capture path may include a first capture viewpoint from which the spherical visual content was captured at a first point in time within the time duration. In some implementations, the capture path taken by the image sensor(s) during the time duration may be determined based on an analysis of the spherical visual content and/or motion and orientation information for the image sensor(s). The motion and orientation information for the image sensor(s) may be generated by a motion and orientation sensor.

The smoothed path component may be configured to determine a smoothed path based on the capture path. The smoothed path may have smoother changes in positions and/or orientations than the capture path. The smoothed path may include smoothed viewpoints. The smoothed path may include a first smoothed viewpoint at the first point in time within the time duration. In some implementations, the smoothed path having smoother changes in positions and/or orientations than the capture path may be characterized by a maximum rate of changes in positions and/or orientations of the smoothed path being smaller than a maximum rate of changes in positions and/or orientations of the capture path. In some implementations, the smoothed path having smoother changes in positions and/or orientations than the capture path may be characterized by the smoothed path having less jitters in positions and/or orientations than the capture path.

The warp component may be configured to warp the image space. The image space may be warped based on a difference between the capture path and the smoothed path. The difference between the capture path and the smoothed path may include a difference between the positions of the first capture viewpoint and the first smoothed viewpoint at the first point in time. In some implementations, warping the image space may include warping the image space for a portion of the time duration.

The stabilized visual content component may be configured to determine the stabilized visual content. The stabilized visual content may be determined by projecting the spherical visual content represented in the warped image space to the spherical projection space. Views of the stabilized visual content may appear to be from the smoothed viewpoints such that a view of the stabilized visual content corresponding to the first point in time appears to be from the first smoothed viewpoint.

The display component may be configured to effectuate presentation of the stabilized visual content on a display. A user may be presented with the stabilized visual content through a graphical user interface of a visual application. In some implementations, presentation of the stabilized visual content on the display may include playback of the stabilized visual content at a play rate faster than a capture rate at which the image sensor(s) captured the spherical visual content for at least a portion of the time duration. In some implementations, the smoothed viewpoints may include a viewing field of view and a viewing rotation of the stabilized visual content, and the presentation of the stabilized visual content on the display may include playback of portions of the stabilized visual content corresponding to the viewing field of view and the viewing rotation of the stabilized visual content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
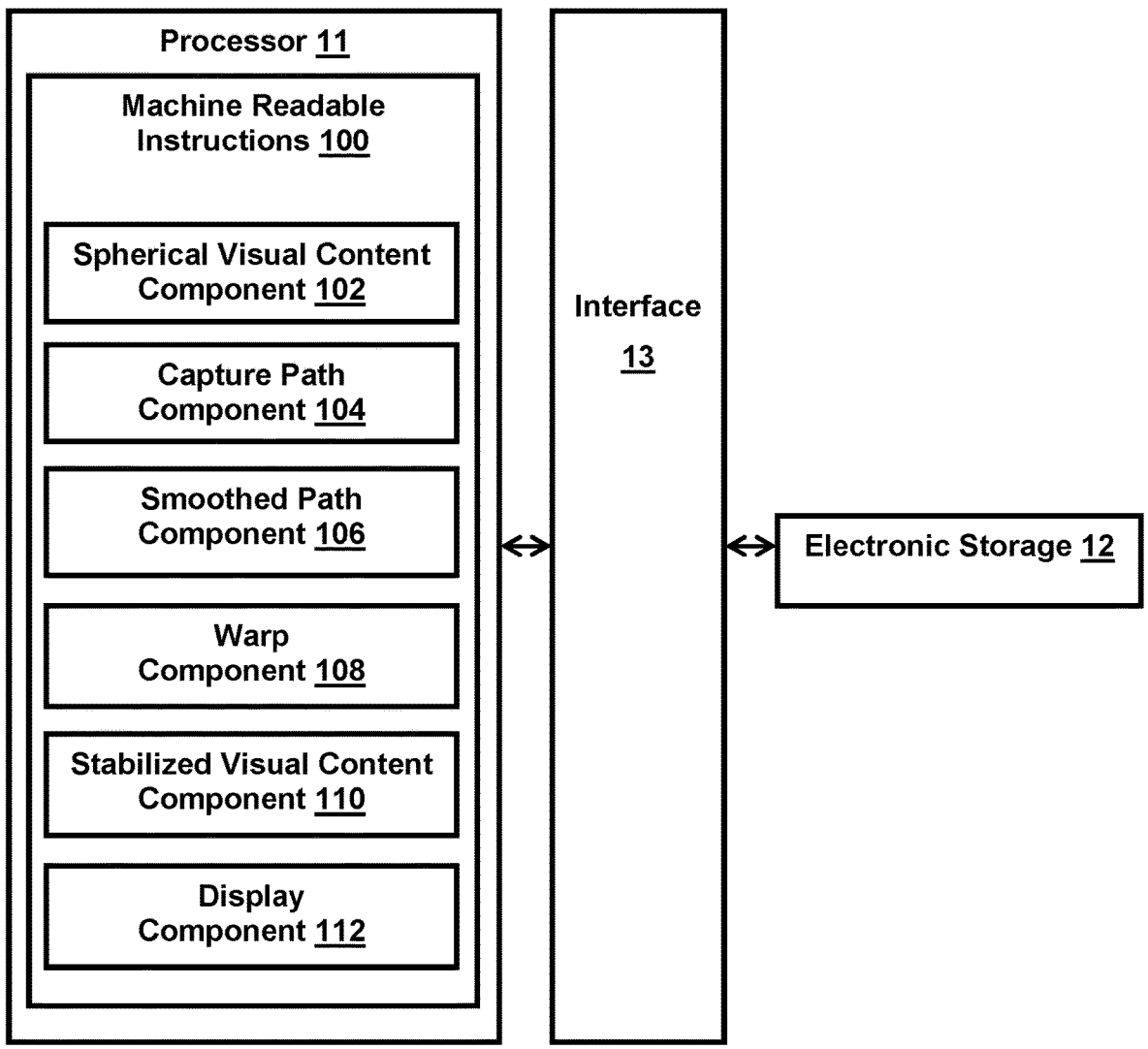
FIG. 1 illustrates a system for generating stabilized visual content using spherical visual content.

FIG. 1 illustrates system 10 for generates stabilized visual content using spherical visual content. System 10 may include one or more of processor 11, electronic storage 12, bus 13, and/or other components. The spherical visual content may be obtained by processor 11. The spherical visual content may include pixels represented in an image space. The spherical visual content may have been captured by image sensor(s) during a time duration. The spherical visual content may include phenomena caused by motion of the image sensor(s) and/or optical components that guide light onto the image sensor(s) during at least a part of the time duration. A capture path taken by the image sensor(s) during the time duration may be determined. The capture path may reflect positions and orientations of the image sensor(s) during the time duration. The capture path may include capture viewpoints from which the image sensor(s) captured the visual content during the time duration. A smoothed path may be determined based on the capture path. The smoothed path may have smoother changes in positions and/or orientations than the capture path. The smoothed path may include smoothed viewpoints. The image space may be warped based on a difference between the capture path and the smoothed path. The stabilized visual content may be determined by projecting the spherical visual content represented in the warped image space to a spherical projection space. Presentation of the stabilized visual content on a display may be effectuated.

Electronic storage 12 may include electronic storage medium that electronically stores information. Electronic storage 12 may store software algorithms, information determined by processor 11, information received remotely, and/or other information that enables system 10 to function properly. For example, electronic storage 12 may store information relating to spherical visual content, phenomena caused by motion of image sensor(s) and/or optical components that guide light onto the image sensor(s), capture path, capture viewpoints, smoothed path, smoothed viewpoints, image space, warping of image space, spherical projection space, stabilized visual content, and/or other information.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 100 to facilitate generating stabilized visual content using spherical visual content. Machine-readable instructions 100 may include one or more computer program components. Machine readable instructions 100 may include one or more of spherical visual content component 102, capture path component 104, smoothed path component 106, warp component 108, stabilized visual content component 110, display component 112, and/or other computer program components.

Spherical visual content component 102 may be configured to obtain spherical visual content. Spherical visual content may include visual content obtained by a spherical capture. Visual content may refer to media content that may be observed visually. Visual content may include one or more of an image, a sequence of images, a frame of a video, a video, and/or other visual content. Spherical visual content may be obtained by a spherical capture through use of one or more cameras/image sensors. For example, spherical visual content may be captured by using multiple cameras/image sensors to capture images/video from a location and stitching the images/videos together.

In some implementations, the image sensor(s) may be carried (e.g., attached to, supported, held, disposed on, and/or otherwise carried) by an object (e.g., a gimbal,). In some implementations, the image sensor(s) may be carried by a vehicle (e.g., a car, a bike, a boat, an airplane, etc.). In some implementations, the image sensor(s) may be carried by a remote controlled vehicle (e.g., remote controlled airplane, remote controlled car, remoted controlled submarine, etc.). In some implementations, the image sensor(s) may be carried by an unmanned aerial vehicle (e.g., drones, etc.). In some implementations, the image sensor(s) may be carried by a person. In some implementations, the image sensor(s) may be carried by an animal. Other carryings of the image sensor(s) are contemplated.

Spherical visual content may have been captured by image sensor(s) during a time duration. The spherical visual content may include phenomena caused by motion of the image sensor(s) and/or optical components that guide light onto the image sensor(s) during at least a part of the time duration. Optical components may refer to components that directly and/or indirectly guide light onto the image sensors. Optical components may include one or more of a lens, a mirror, a prism, and/or other optical components.

Phenomena may refer to one or more visually observable characteristics captured within the spherical visual content. Phenomena may be captured within one or more visual portions (e.g., visual extents, etc.) of the spherical visual content. Phenomena may be captured within one or more moments within the spherical visual content and/or one or more durations within the spherical visual content. For example, phenomena may include one or more shakings of the visuals within the spherical visual content due to shaking(s) of the image sensor(s) and/or optical components that guide light onto the image sensor(s), one or more movements of the visuals within the spherical visual content due to movement(s) of the image sensor(s) and/or optical components that guide light onto the image sensor(s), one or more rotations of the visuals within the spherical visual content due to rotation(s) of the image sensor(s) and/or optical components that guide light onto the image sensor(s), and/or other phenomena.

Spherical visual content may include pixels represented in an image space. The image space may include a projection point inside the image space. In some implementations, the projection point may coincide with a center of the spherical visual content represented in the image space. The spherical visual content may be transformed into a spherical projection space by projecting the pixels in the image space to the spherical projection space along lines including the projection point. One or more portions of the image space may be smaller than the spherical projection space. One or more portions of the image space may be the same size as the spherical projection space. One or more portions of the image space may be larger than the spherical projection space.

Figure 3A:
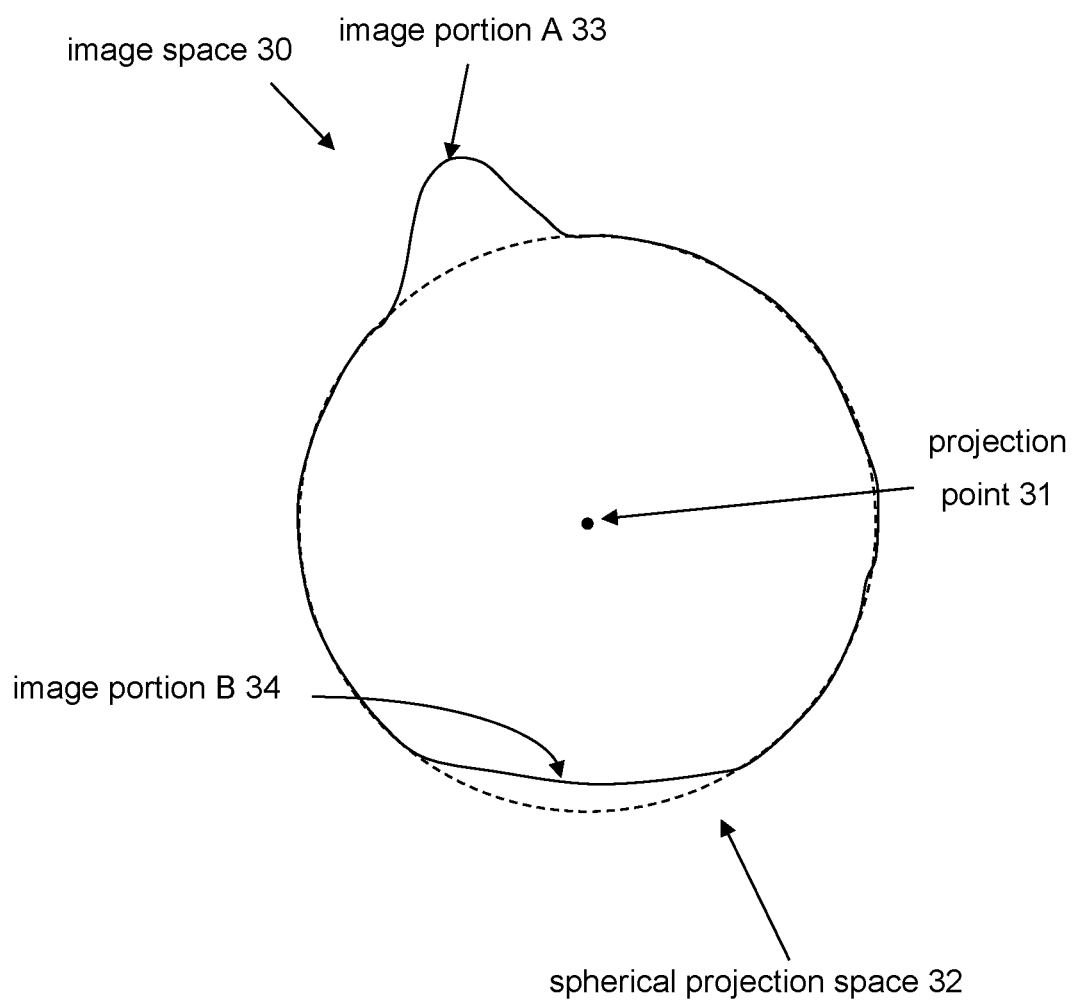
FIG. 3A illustrates an example of an image space and a spherical projection space.

FIG. 3A illustrates a non-limiting example of image space 30 and spherical projection space 32. In FIG. 3A, image space 30 is shown as a solid line and spherical projection space 32 is shown as a dashed line. Pixels of spherical visual content may be represented in image space 30. Image space 30 may include projection point 31. Projection point 31 may coincide with the center of the spherical visual content represented in image space 30. The center of image space 30 and the center of spherical projection space 32 may be located at the same point. For example, the center of image space 30 and the center of spherical projection space 32 may be located at projection point 31.

One or more portions of image space 30 may be smaller than spherical projection space 32. One or more portions of image space 30 that are smaller than spherical projection space 32 may lie inside spherical projection space 32. For example, a bottom portion of image space 30 (image portion B 34) may be smaller than spherical projection space 32. Image portion B 34 may lie inside spherical projection space 32.

One or more portions of image space 30 may be the same size as spherical projection space 32. One or more portions of image space 30 that are the same size as spherical projection space 32 may lie on spherical projection space 32. For example, sides of image space 30 may be the same size as spherical projection space 32. The sides of image space 30 may lie on spherical projection space 32.

One or more portions of image space 30 may be larger than spherical projection space 32. One or more portions of image space 30 that are larger than spherical projection space 32 may lie outside spherical projection space 32. For example, a top portion of image space 30 (image portion A 33) may be larger than spherical projection space 32. Image portion A 33 may lie outside spherical projection space.

Figure 3B:
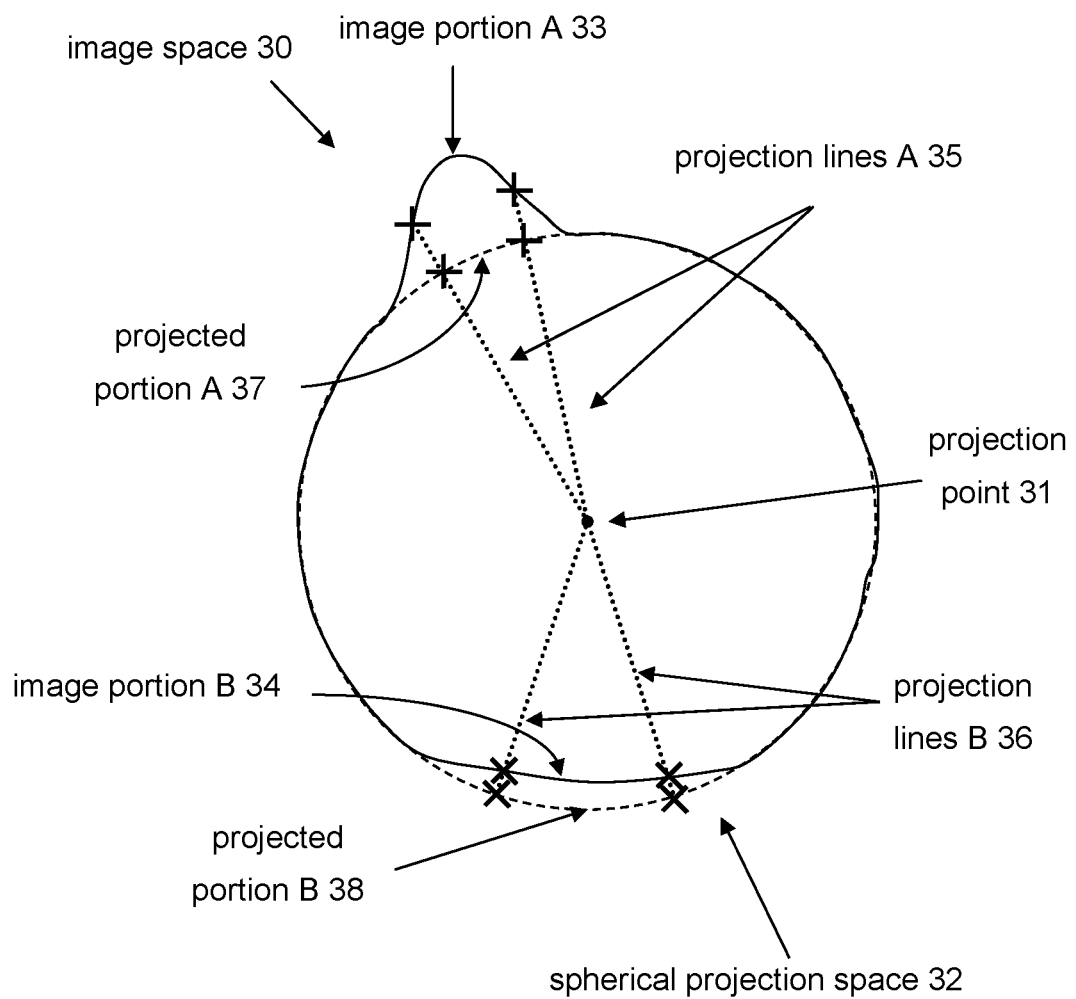
FIG. 3B illustrates examples of an image space projected onto a spherical projection space.

Pixels of the spherical visual content represented in image space 30 may be transformed into spherical projection space 32 by projecting the pixels in image space 30 to spherical projection space 32 along lines including projection point 31. FIG. 3B illustrates a non-limiting example of spherical visual content represented in image space 30 that is projected onto spherical projection space 32. For example, one or more pixels of the spherical visual content may be located along image portion A 33. One or more pixels from image portion A 33 may be projected to projected portion A 37 of spherical projection space 32. For example, two pixels from image portion A 33 may be projected to projected portion A 37 along projection lines A 35. Projecting pixels from outside of spherical projection space 32 to spherical projection space 32 may decrease dimensions of the projected pixels. For example, projecting pixels from image portion A 33 to projected portion A 37 may decrease dimensions of the pixels to squeeze into a smaller space.

One or more pixels of the spherical visual content may be located along image portion B 34. One or more pixels from image portion B 34 may be projected to projected portion B 38 of spherical projection space 32. For example, two pixels from image portion B 34 may be projected to projected portion B 38 along projection lines B 36. Projecting pixels from inside of spherical projection space 32 to spherical projection space 32 may increase dimensions of the projected pixels. For example, projecting pixels from image portion B 34 to projected portion B 38 may increase dimensions of the pixels to expand into a larger space.

One or more pixels of the spherical visual content may be located along spherical projection space 32. The locations of such pixels projected to spherical projection space 32 may coincide with the locations of such pixels in image space 30. Dimensions of such pixels may remain the same between image space 30 and projection space 32.

Capture path component 104 may be configured to determine a capture path taken by the image sensor(s) during a time duration. A capture path may reflect positions and/or orientations of the image sensor(s) during the time duration. A capture path may reflect changes in positions and/or orientations of the image sensor(s) in a two-dimensional space, a three-dimensional space, and/or other dimensional spaces.

Figure 4A:
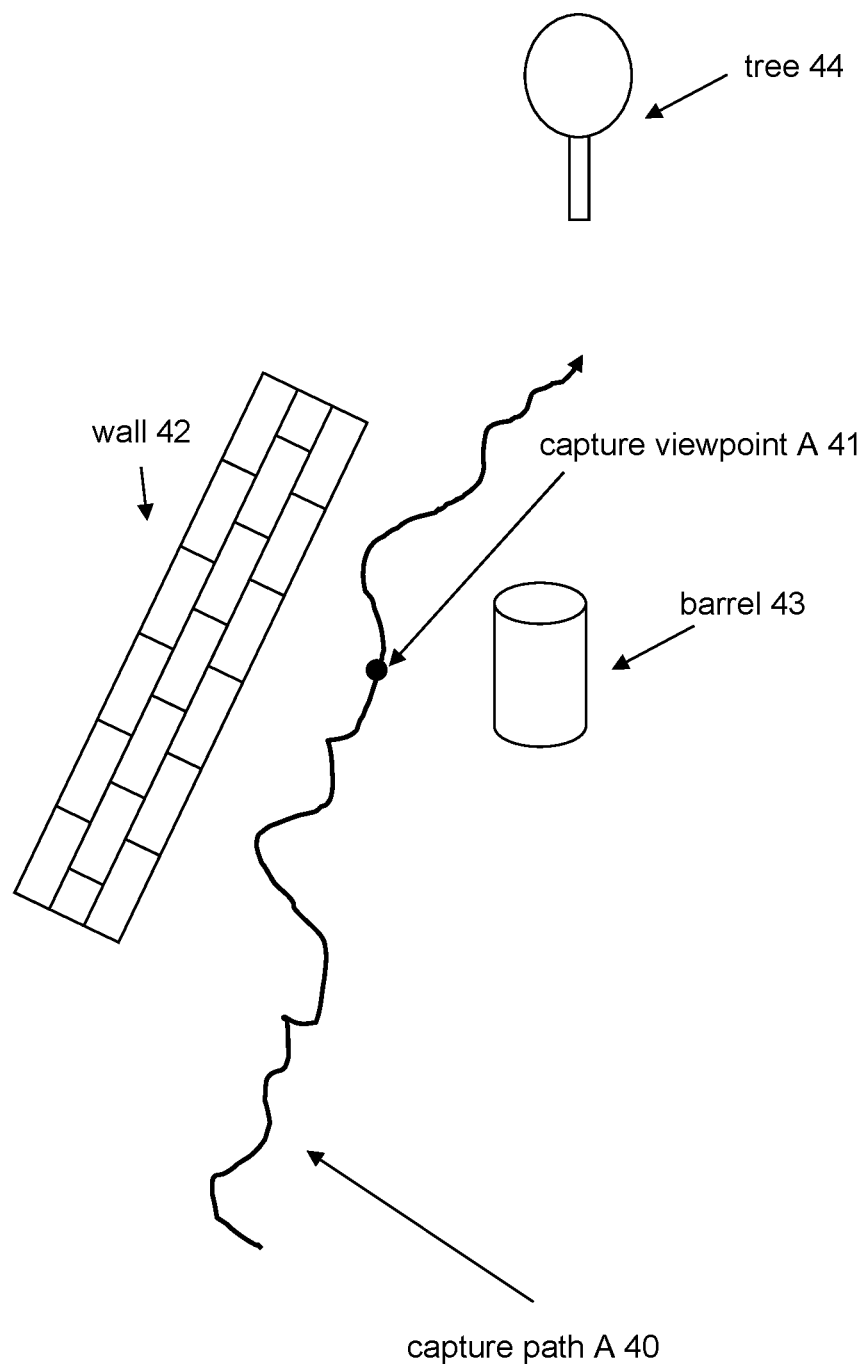
FIG. 4A illustrates an example of a capture path taken by image sensor(s) during a time duration.

FIG. 4A illustrates a non-limiting example of capture path A 40 taken by image sensor(s) during a time duration.

Capture path A 40 may reflect position(s) and/or orientation(s) of the image sensor(s) during the time duration. For example, capture path A 40 may reflect changes in positions of the image sensor(s) in a two dimensional space and/or a three-dimensional space as the image sensor(s) move past wall 42 and barrel 43, towards tree 44.

A capture path may include capture viewpoints from which the image sensor(s) captured the spherical visual content during the time duration. Capture viewpoints may correspond to particular moments and/or durations within the time duration. Capture viewpoints may reflect a position and/or orientation of the image sensor(s) at particular moments or durations within the time duration. For example, a capture path may include a first capture viewpoint from which spherical visual content was captured at a first point in time within the time duration. The first capture viewpoint may reflect the position and/or orientation of the image sensor(s) at the first point in time.

For example, capture path A 40 may include capture viewpoint A 41 and/or other capture viewpoints. Capture viewpoint A 41 may correspond to a particular moment and/or duration within the time duration. Capture viewpoint A 41 may reflect a position and/or orientation of the image sensor(s) at the particular moment and/or duration within the time duration.

Figure 4B:
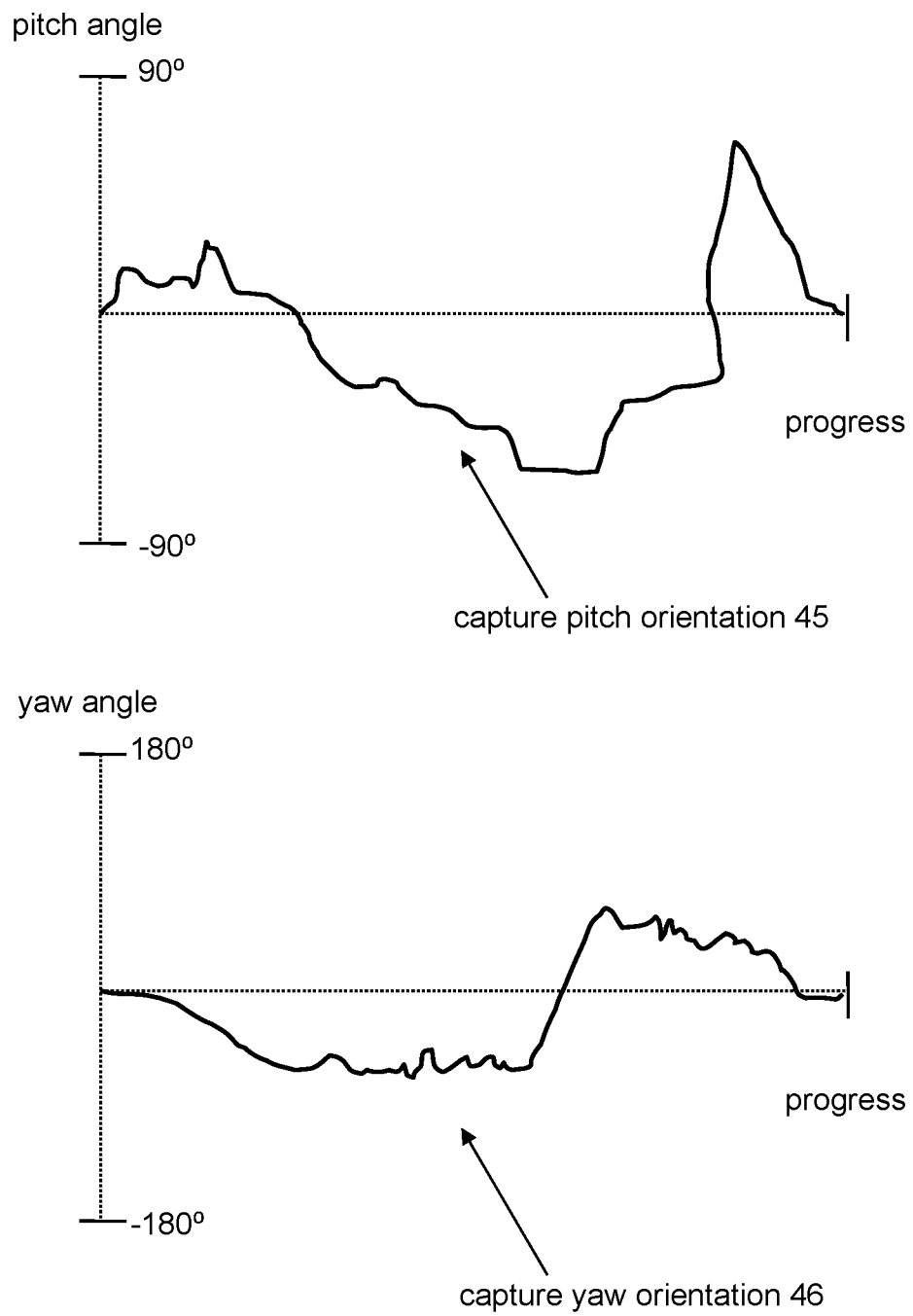
FIG. 4B illustrates an example of capture orientations of image sensor(s) during a time duration.

FIG. 4B illustrates a non-limiting example of capture orientations of image sensor(s) during a time duration. FIG. 4B illustrates changes in capture pitch orientation 45 and capture yaw orientation 46 of the image sensor(s) as a function of progress over capture path A 40 and/or the time duration. Capture pitch orientation 45 may reflect changes in pitch orientation of the image sensor(s) as the image sensor(s) move past wall 42 and barrel 43, towards tree 44 and/over the time duration. Capture yaw orientation 45 may reflect changes in yaw orientation of the image sensor(s) as the image sensor(s) move past wall 42 and barrel 43, towards tree 44 and/or over the time duration.

The capture path taken by the image sensor(s) during the time duration may be determined based on an analysis of the spherical visual content and/or motion and orientation information for the image sensor(s). For example, a sparse depth map may be computed from the spherical visual content. The sparse depth (e.g., including 100-200 points, etc.) may by computed for one or more frames of the spherical visual content. The sparse depth map may be used to compute the capture path taken by the image sensor(s).

The motion and orientation information for the image sensor(s) may be generated by one or more motion and orientation sensors. Motion and orientation information for the image sensor(s) may characterize one or more motion and/or orientation of the image sensor(s). Motion of the image sensor(s) may include one or more of movement of the image sensor(s), change in position of the image sensor(s), and/or other motion of the image sensor(s) at a time or over a period of time. Orientation of the image sensor(s) may include one or more of yaw, pitch, and/or roll of the image sensor(s), change in yaw, pitch, and/or roll of the image sensor(s), and/or other orientations of the image sensor(s) at a time or over a period of time. As a non-limiting example, a motion and orientation sensor may include one or more of a global positioning system, an accelerometer, a gyroscope, a magnetometer, an inertial measurement unit, a magnetic position sensor, a radio-frequency position sensor, and/or other motion and orientation sensors.

Smoothed path component 106 may be configured to determine a smoothed path. A smoothed path may be determined based on a capture path and/or other information. Smoothed path component 106 may stabilize the motion of the image sensor(s) within a two-dimensional space and/or a three-dimensional space over time (e.g., the time duration during which the image sensor(s) moved within the capture path). One or more smoothed path algorithms may be used to determine the smoothed path based on the capture path. By way of non-limiting examples, smoothed path algorithms may include cubic Bezier curve, spline, BSpline, and/or other smoothed path algorithms.

A smoothed path may have smoother changes in positions and/or orientations than a capture path. In some implementations, the smoothed path having smoother changes in positions and/or orientations than the capture path may be characterized by a maximum rate of changes in positions and/or orientations of the smoothed path being smaller than a maximum rate of changes in positions and/or orientations of the capture path. In some implementations, the smoothed path having smoother changes in positions and/or orientations than the capture path may be characterized by the smoothed path having less jitters in positions and/or orientations than the capture path.

Figure 5A:
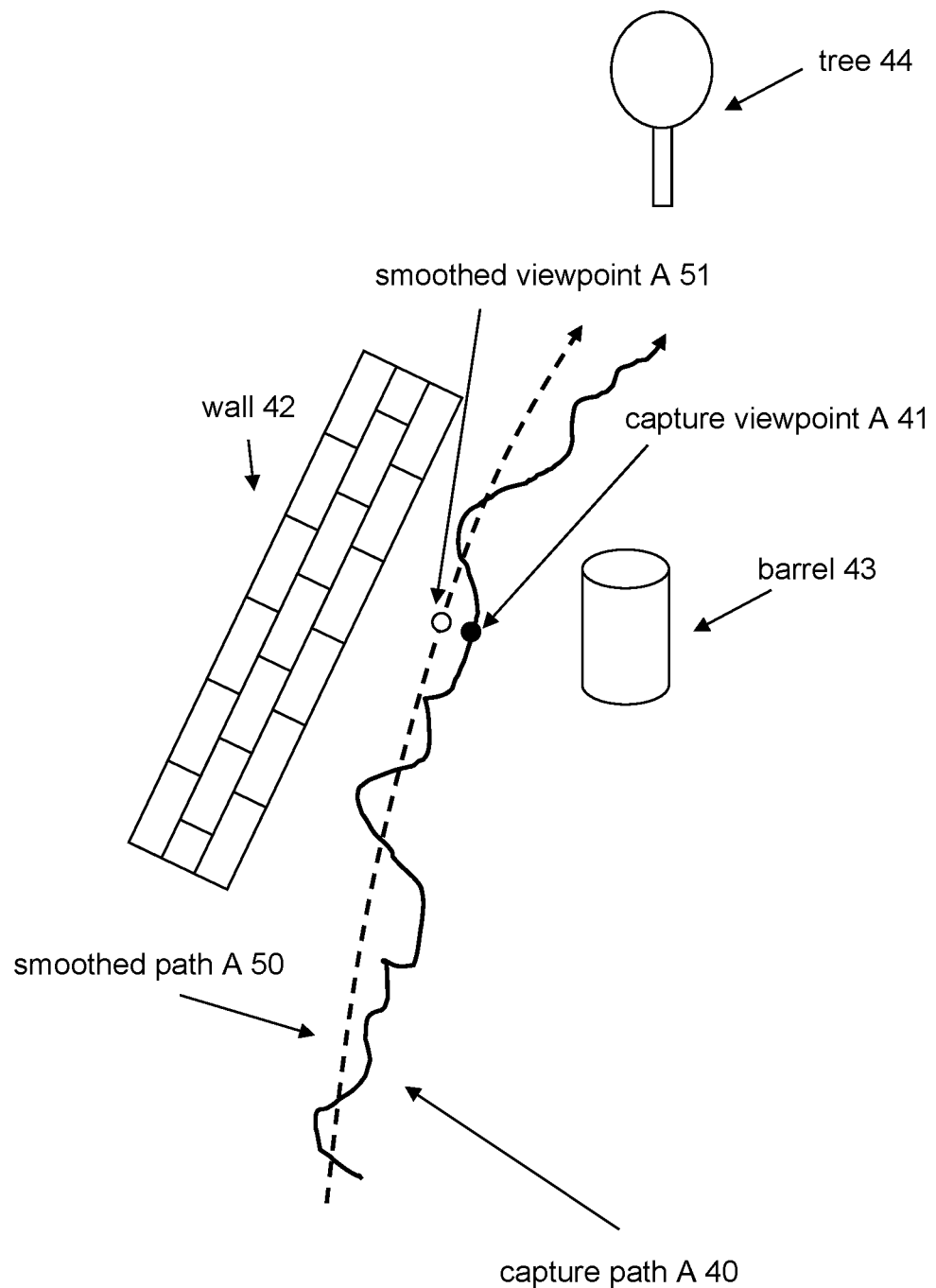
FIG. 5A illustrates an example of a capture path taken by image sensor(s) during a time duration and a smoothed path.

FIG. 5A illustrates a non-limiting example of capture path A 40 taken by image sensor(s) during a time duration and smoothed path A 50. Smoothed path A 50 may be determined based on capture path A 40, and/or other information. Smoothed path A 50 may reflect changes to the positions of the image sensor(s) reflected in capture viewpoints of capture path A 40. As shown in FIG. 5A, smoothed path A 50 may have smoother changes in positions than capture path A 40. Smoothed path A may be characterized with a maximum rate of changes in positions that is smaller than a maximum rate of changes in positions of capture path A 40. Smoothed path A may be characterized by less jitters in positions than capture path A 40.

Figure 5B:
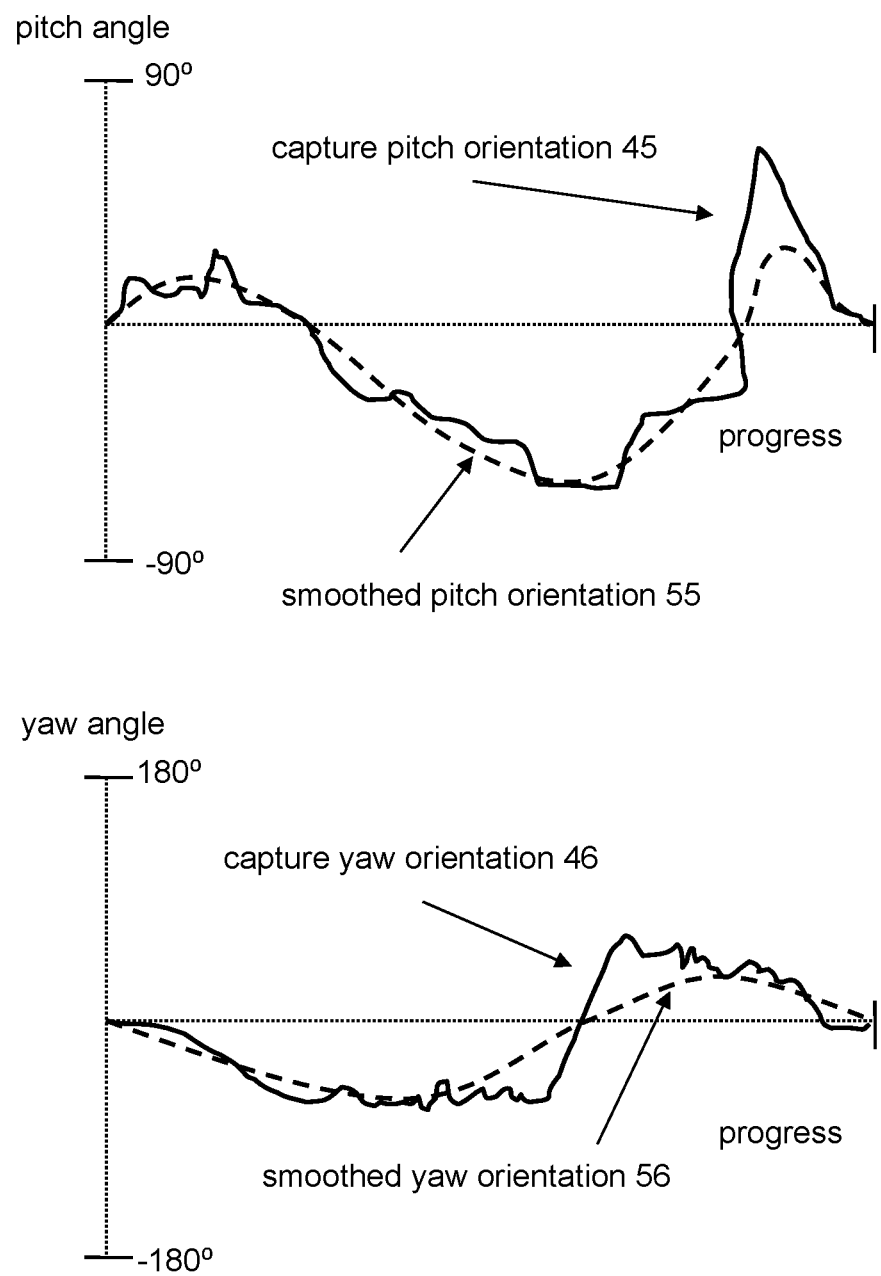
FIG. 5B illustrates an example of capture orientations of image sensor(s) during a time duration and smoothed orientations.

FIG. 5B illustrates a non-limiting example of capture orientations of image sensor(s) during a time duration and smoothed orientations. Smoothed pitch orientation 55 and/or smoothed yaw orientation 56 may reflect changes to the orientations of the image sensor(s) reflected in capture viewpoints of capture path A 40. As shown in FIG. 5B, smoothed pitch orientation 55 may have smoother changes in orientations than capture pitch orientation 45. Smoothed yaw orientation 56 may have smoother changes in orientations than capture yaw orientation 46. Smoothed pitch orientation 55 may be characterized with a maximum rate of changes in orientations that is smaller than a maximum rate of changes in orientations of capture pitch orientation 45. Smoothed yaw orientation 56 may be characterized with a maximum rate of changes in orientations that is smaller than a maximum rate of changes in orientations of capture yaw orientation 46. Smoothed pitch orientation 55 may be characterized by less jitters in orientations than capture pitch orientation 45. Smoothed yaw orientation 56 may be characterized by less jitters in orientations than capture pitch orientation 46.

A smoothed path may include smoothed viewpoints. Smoothed viewpoints may correspond to particular moments or durations within the time duration. Smoothed viewpoints may reflect changes to the positions and/or orientations of the image sensor(s) reflected in capture viewpoints. For example, a smoothed path may include a first smoothed viewpoint at the first point in time within the time duration. The first smoothed viewpoint may reflect changes to the position and/or orientation of the image sensor(s) reflected in the first capture viewpoint.

For example, as shown in FIG. 5A, smoothed path A 50 may include smoothed viewpoint A 51 and/or other smoothed viewpoints. Smoothed viewpoint A 51 may correspond to a particular moment and/or duration within the time duration. Smoothed viewpoint A 51 may reflect changes to the position and/or orientation of the image sensor(s) at the particular moment and/or duration within the time duration. Smoothed viewpoint A 51 may reflect changes to the position and/or orientation of the image sensor(s) reflected in capture viewpoint A 41. For example, smoothed viewpoint A 51 may reflect changes to the position of capture viewpoint A 41 being moved to the left from capture path A 40. Other changes in the positions and/or orientations of the image sensor(s) are contemplated.

Figure 7A:
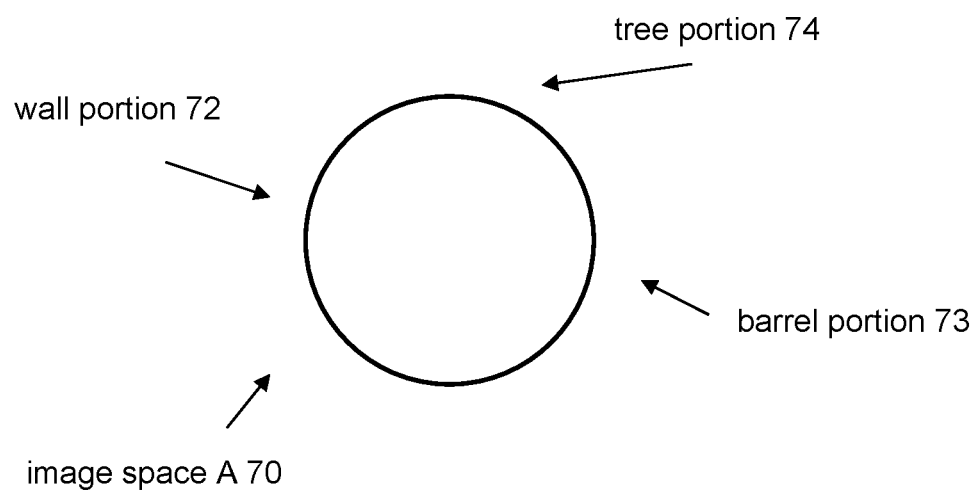
FIG. 7A illustrates an example of spherical visual content represented in an image space.

Warp component 108 may be configured to warp the image space. The image space may be warped based on one or more differences between the capture path and the smoothed path. For example, FIG. 7A illustrates a non-limiting example of spherical visual content represented in image space A 70. The spherical visual content represented in image space A 70 may have been captured during a movement of image sensor(s) through capture path A 40. FIG. 7A may illustrate the spherical visual content represented in image space A 70 at capture viewpoint A 41. Image space A 70 may include pixels for wall portion 72 (corresponding to wall 42), barrel portion 73 (corresponding to barrel 43), tree portion 74 (corresponding to tree 44), and/or other portions of the spherical visual content.

Warp component 108 may warp image space A 70 based on one or more differences between capture path A 40 and smoothed path A 50. Differences between capture path A 40 and smoothed path A 50 may include one or more differences in the positions between capture viewpoints and smoothed viewpoints. A difference between capture path A 40 and smoothed path A 50 may include a difference between position of capture viewpoint A 41 and position of smoothed viewpoint A 51 at a particular point in time. For example, as shown in FIG. 5A, smoothed viewpoint A 51 may be positioned to the left of capture viewpoint A 41 by a certain distance. Position of capture viewpoint A 41 and position of smoothed viewpoint A 51 may include the same and/or different distances to objects near capture viewpoint A 41 and/or smoothed viewpoint A 51. For example, smoothed viewpoint A 51 may be closer to wall 42 than capture viewpoint A 41. Smoothed viewpoint A 51 may be further away from barrel 43 than capture viewpoint A 41. Smoothed viewpoint A 51 may be at a same distance to tree 44 as capture viewpoint A 41. Other differences between the capture path and the smoothed path are contemplated.

Warp component 108 may warp the image space based on the amount of difference(s) between the positions between capture viewpoints and smoothed viewpoints. Warp component 108 may warp the image space with larger deformations for larger differences between the positions between capture viewpoints and smoothed viewpoints. Warp component 108 may warp the image with smaller deformations for smaller differences between the positions between capture viewpoints and smoothed viewpoints.

Figure 7B:
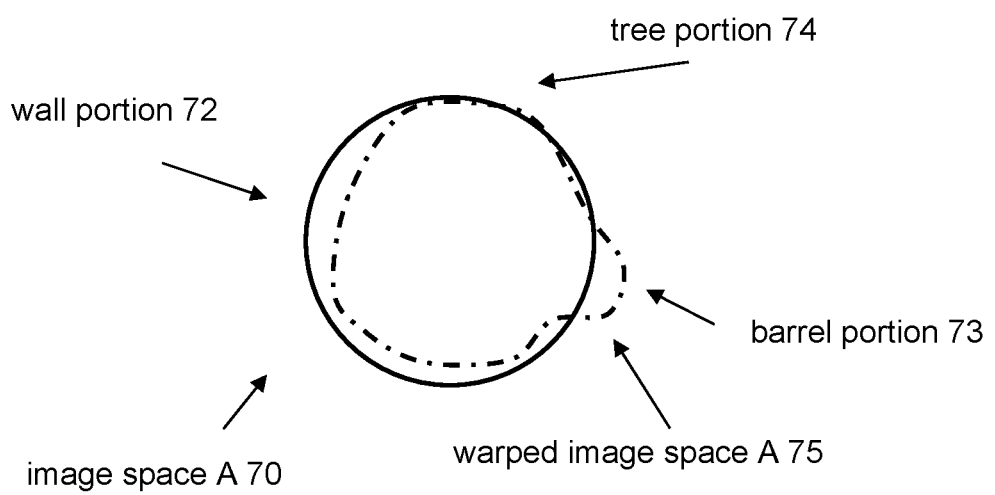
FIG. 7B illustrates an example of spherical visual content represented in a warped image space.

Warp component 108 may warp the image space based on the differences in positions between capture viewpoint A 41 and smoothed viewpoint A 51. For example, based on smoothed viewpoint A 51 being located to the left of capture viewpoint A 41, warp component 108 may warp image space A 70 to warped image space A 75, as shown in FIG. 7B. In warped image space A 75, dimensions of wall portion 72 may be decreased. Wall portion 72 may be pushed in so that wall portion 72 in warped image space A 75 is located inside dimensions of image space A 70. In warped image space A 75, dimensions of barrel portion 73 may be increased. Barrel portion 73 may be pushed out so that barrel portion 73 in warped image space A 75 is located outside dimensions of image space A 70. In warped image space A 75, dimensions of tree portion 74 may remain the same. Tree portion 74 may remain the same so that tree portion 74 in warped image space A 75 is located along dimensions of image space A 70.

In some implementations, one or more sparse depth maps may be used to determine the amount of deformation for the image space. The amount of deformation for a particular smoothed viewpoint may correspond to a deformation that solves for the sparse 3D points and keeps their depth from the smoothed viewpoint based on the deformed image space. For example, image space A 70 may be warped so that the amounts of deformation correspond to the depths of objects from smoothed viewpoint A 51.

In some implementations, the amounts of deformation may be measured by a norm defined based on one or more objects around the image sensor(s). For example, a norm may be defined as a distance between the image sensor(s) and one or more objects closest to the image sensor(s). A small difference between the positions between capture viewpoints and smoothed viewpoints may be defined as distances between the capture viewpoints and the smooth viewpoints that are smaller than the norm. A big difference between the positions between capture viewpoints and smoothed viewpoints may be defined as distances between the capture viewpoints and the smooth viewpoints that are bigger than the norm.

Figure 6:
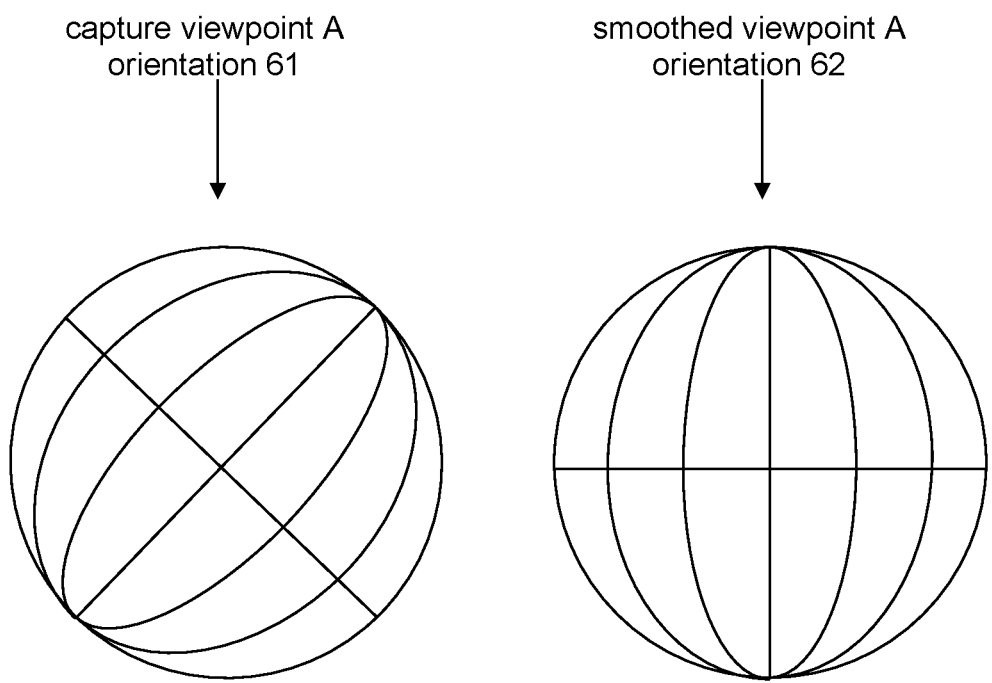
FIG. 6 illustrates an example of difference in orientations for a capture viewpoint and a smoothed viewpoint.

In some implementations, a difference between the capture path and the smoothed path may include one or more differences in the orientations between capture viewpoints and smoothed viewpoints. FIG. 6 illustrates a non-limiting example of differences in orientations for a capture viewpoint and a smoothed viewpoint. Capture viewpoint A orientation 61 may reflect the orientation of the image sensor(s) at capture viewpoint A 41. Capture viewpoint A orientation 61 may be tilted to the right. Capture viewpoint A orientation 61 may be tilted to the right based on the image sensor(s) at capture viewpoint A 41 being tilted to the right. Smoothed viewpoint A orientation 62 may reflect changes to the orientation of the image sensor(s) reflected at capture viewpoint A 41. Smoothed viewpoint A orientation A 62 may be upright. Other changes in positions and/or orientations of the image sensor(s) are contemplated.

In some implementations, warping the image space may include warping the image space for a portion of the time duration. In some implementations, warping the spherical visual content may include warping the spherical visual content for the time duration. Warping the image space may include warping the image space for one or more parts of the time duration or for the entire time duration. For example, spherical visual content may be captured for thirty minutes. Image space for the spherical visual content may be warped for a part of the thirty minutes (e.g., from one-minute mark to four-minute thirty-second mark, etc.), multiple parts of the thirty minutes (e.g., from two-minute mark to five-minute mark and from ten-minute twenty second-mark to twenty-minute forty-second mark, etc.), or for the entire thirty minutes.

Stabilized visual content component 110 may be configured to determine stabilized visual content. The stabilized visual content may be determined by projecting the spherical visual content represented in the warped image space to a spherical projection space. The spherical visual content represented in the warped image space may be transformed into the spherical projection space by projecting the pixels in the warped image space to the spherical projection space along lines including the projection point.

Figure 8:
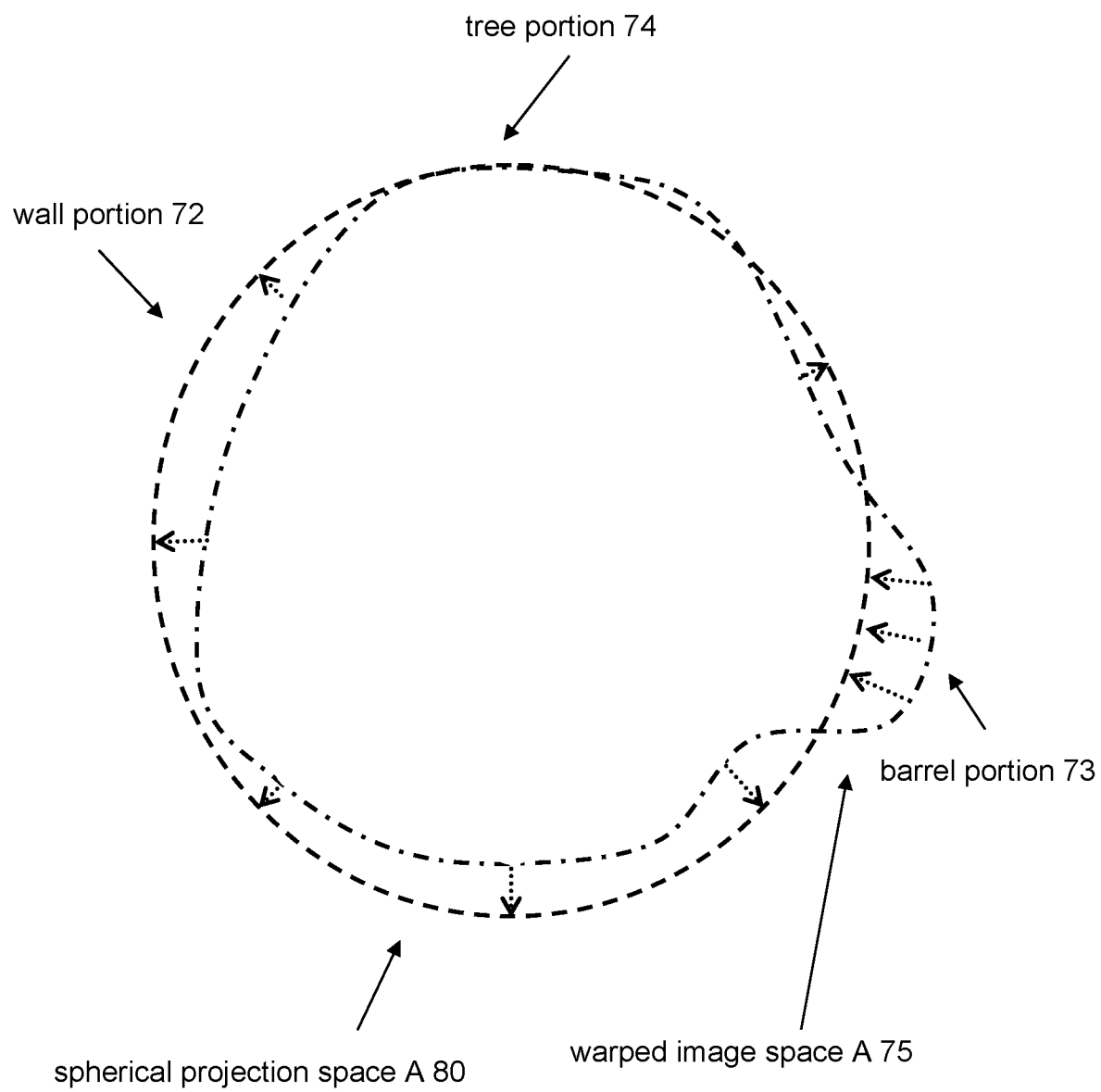
FIG. 8 illustrates an example of projecting spherical visual content represented in a warped image space to a spherical projection space.

FIG. 8 illustrates a non-limiting example of projecting spherical visual content represented in warped image space A 75 to spherical projection space A 80. Spherical projection space A 80 may have the same dimensions as image space A 70. Other dimensions of spherical projection space A 80 are contemplated.

Pixels of spherical visual content may be represented in warped image space A 75. Pixels of the spherical visual content represented in warped image space A 75 may be projected to spherical projection space A 80 along lines (shown as dotted arrows in FIG. 8) including a projection point (not shown). The projection point may coincide with the center of the spherical visual content represented in the image space A 70. The center of image space A 70 and the center of spherical projection space A 80 may be located at the same point.

Wall portion 72 of warped image space A 75 may be projected out to spherical projection space A 80. Projection of pixels from inside spherical projection space A 80 to spherical projection space A 80 may increase the dimensions of the projected pixels. For example, the dimensions of pixels corresponding to wall portion 72 of warped image space A 75 may increase to expand into a larger space in spherical projection space A 80.

Barrel portion 73 of warped image space A 75 may be projected into spherical projection space A 80. Projection of pixels from outside spherical projection space A 80 to spherical projection space A 80 may decrease the dimensions of the projected pixels. For example, the dimensions of pixels corresponding to barrel portion 73 of warped image space A 75 may decrease to squeeze into a smaller space in spherical projection space A 80.

Tree portion 74 of warped image space A 75 may be projected onto spherical projection space A 80. Projections of pixels located along spherical projection space A 80 may not change the dimensions of the projected pixels. For example, the dimensions of pixels corresponding to tree portion 74 of warped image space A 75 may not change when projected into the same sized space in spherical projection space A 80.

Figure 10:
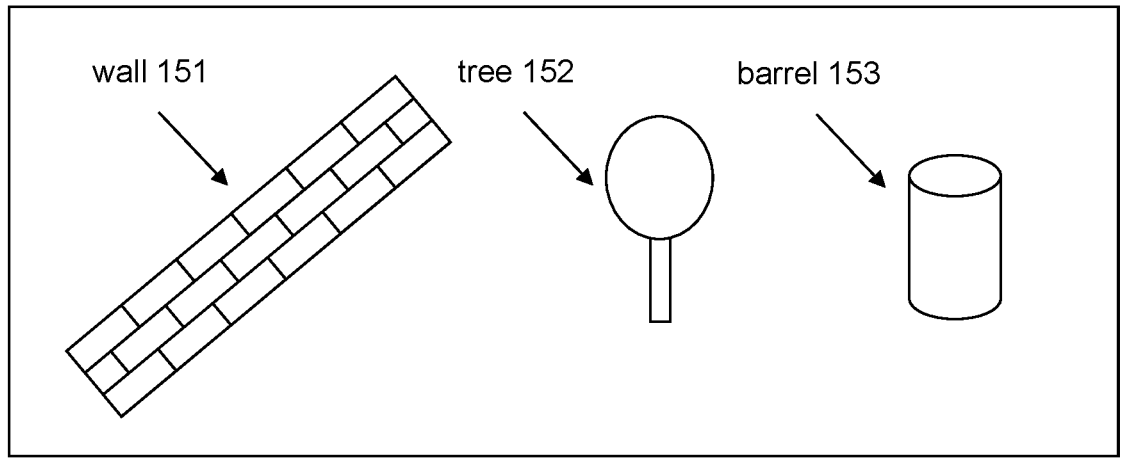
FIG. 10 illustrates an example of an original image.
Figure 11:
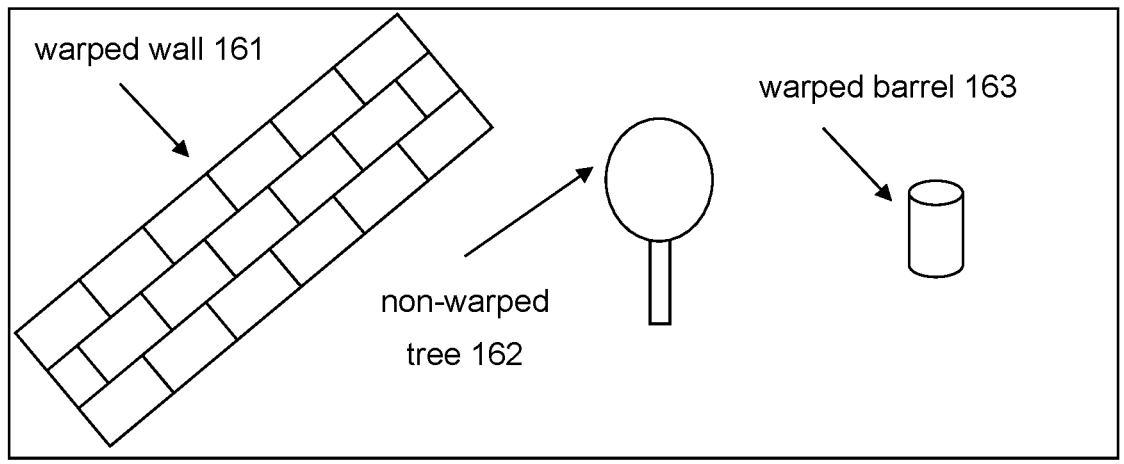
FIG. 11 illustrates an example of a warped image.

Views of the stabilized visual content may appear to be from the smoothed viewpoints such that a view of the stabilized visual content corresponding to a particular point in time appears to be from a corresponding smoothed viewpoint. For example, in FIG. 5A, a view of the stabilized visual content at a particular point in time may appear to be from smoothed viewpoint A 51, rather than capture viewpoint A 41. FIGS. 10-11 illustrates non-limiting examples of original image 150 and warped image 160. Original image 150 may include a view of the visual content from capture viewpoint A 41. Warped image 160 may include a view of the corresponding stabilized visual content (e.g., a view of the visual content from smoothed viewpoint A 51, etc.).

For example, smoothed viewpoint A 51 may be closer to wall 42 than capture viewpoint A 41. Warped image 160 may include visuals representing warped wall 161, which may be larger than visual representing wall 151 in original image 150. Smoothed viewpoint A 51 may be further away from barrel 43 than capture viewpoint A 41. Warped image 160 may include visuals representing warped barrel 163, which may be smaller than visual representing barrel 153 in original image 150. Smoothed viewpoint A 51 may be at a same distance to tree 44 as capture viewpoint A 41. Warped image 160 may include visuals representing non-warped tree 162, which may be the same as visual representing tree 152 in original image 150.

Display component 112 may be configured to effectuate presentation of the stabilized visual content on a display. A user may be presented with the stabilized visual content through a graphical user interface of a visual application. A visual application may refer to one or more software, one or more software running on one or more hardware, and/or other applications operating to present visual content on a display. As a non-limiting example, a visual application may include one or more of visual content viewer, visual content editor, and/or other visual applications. As a non-limiting example, a visual application may run on one or more of a mobile device, a desktop device, a camera, and/or other hardware.

In some implementations, presentation of the stabilized visual content on the display may include playback of the stabilized visual content at a play rate faster than a capture rate at which the image sensor(s) captured the spherical visual content for at least a portion of the time duration. The stabilized visual content may be presented at the play rate faster than the capture rate for one or more parts of the time duration or for the entire time duration. For example, spherical visual content may be captured for thirty minutes. The stabilized visual content may be presented at the play rate faster than the capture rate for a part of the thirty minutes (e.g., from one-minute mark to four-minute thirty-second mark, etc.), multiple parts of the thirty minutes (e.g., from two-minute mark to five-minute mark and from ten-minute twenty-second mark to twenty-minute forty second mark, etc.), or for the entire thirty minutes. A relationship between a play rate and a capture rate may be linear or non-linear.

In some implementations, a play rate may be constant. For example, a constant play rate may be a multiple of a capture rate (e.g., a stabilized visual content is played at 10× speed, etc.). In some implementations, a play rate may vary. For example, a play rate may be varied so that motions of varying speeds captured within a visual content appears to be moving at a constant speed during playback of the stabilized visual content (e.g., visual content includes capture of a duration in which the image sensor(s) are moving at 10 meters/second and another duration in which the image sensor(s) are moving at 20 meters/second, and the stabilized visual content is played back so that motion captured within the stabilized visual content appears to be moving at the same speed during both durations, etc.). In some implementations, a play rate may vary based on objects and/or scenes detected within the stabilized visual content. For example, stabilized visual content may include capture of a duration in which a moment of interest occurs and another duration in which a moment of interest does not occur. The play rate may be varied so that the duration in which the moment of interest occurs is played more slowly than the duration in which the moment of interest does not occur.

In some implementations, the smoothed viewpoints may include a viewing field of view and a viewing rotation of the stabilized visual content, and the presentation of the stabilized visual content on the display may include playback of portions of the stabilized visual content corresponding to the viewing field of view and the viewing rotation of the stabilized visual content. The viewing field of view and the viewing rotation of the stabilized visual content may define an extent of the stabilized visual content to be displayed.

Figure 9:
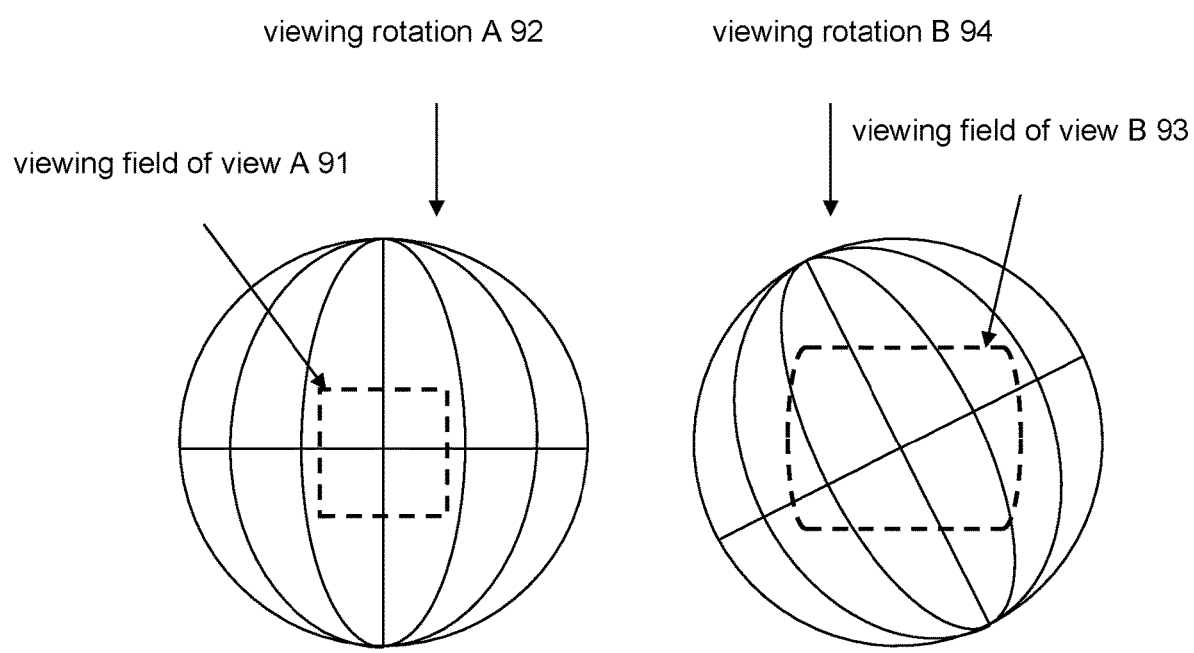
FIG. 9 illustrates examples of viewing fields of view and viewing rotations for smoothed viewpoints.

FIG. 9 illustrates non-limiting examples of viewing fields of view and viewing rotations for two smoothed viewpoints.

First smoothed viewpoint may include viewing field of view A 91 and viewing rotation A 92. Second smoothed viewpoint may include viewing field of view B 93 and viewing rotation B 94. Viewing field of view A 91 may be smaller than viewing field of view B 93. Viewing field of view A 91 and viewing field of view B 93 may be centered at a same point of a stabilized visual content or may be centered at different points of the stabilized visual content. Viewing rotation A 92 may include an upright rotation and viewing rotation B 94 may include a tilted rotation. Presentation of the stabilized visual content corresponding to the first smoothed viewpoint may include presentation of the extent of the stabilized visual content defined by viewing field of view A 91 and viewing rotation A 92. Presentation of the stabilized visual content corresponding to the second smoothed viewpoint may include presentation of the extent of the stabilized visual content defined by viewing field of view B 93 and viewing rotation B 94.

In some implementations, stabilized visual content may be orientated to keep as central view the direction of movement in the smoothed path. Such orientation of the stabilized visual content may reduce adverse effects of viewing the stabilized visual content (e.g., motion sickness, etc.).

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11 and electronic storage 12 are shown to be connected to a bus 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 102, 104, 106, 108, 110 and/or 112 may be eliminated, and some or all of its functionality may be provided by other computer program components. As another example, processor 11 may be configured to execute one or more additional computer program components that may perform some or all of the functionality attributed to one or more of computer program components 102, 104, 106, 108, 110 and/or 112 described herein.

The electronic storage media of electronic storage 12 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 12 may be a separate component within system 10, or electronic storage 12 may be provided integrally with one or more other components of system 10 (e.g., processor 11). Although electronic storage 12 is shown in FIG. 1 as a single entity, this is for illustrative purposes only. In some implementations, electronic storage 12 may comprise a plurality of storage units. These storage units may be physically located within the same device, or electronic storage 12 may represent storage functionality of a plurality of devices operating in coordination.

Figure 2:
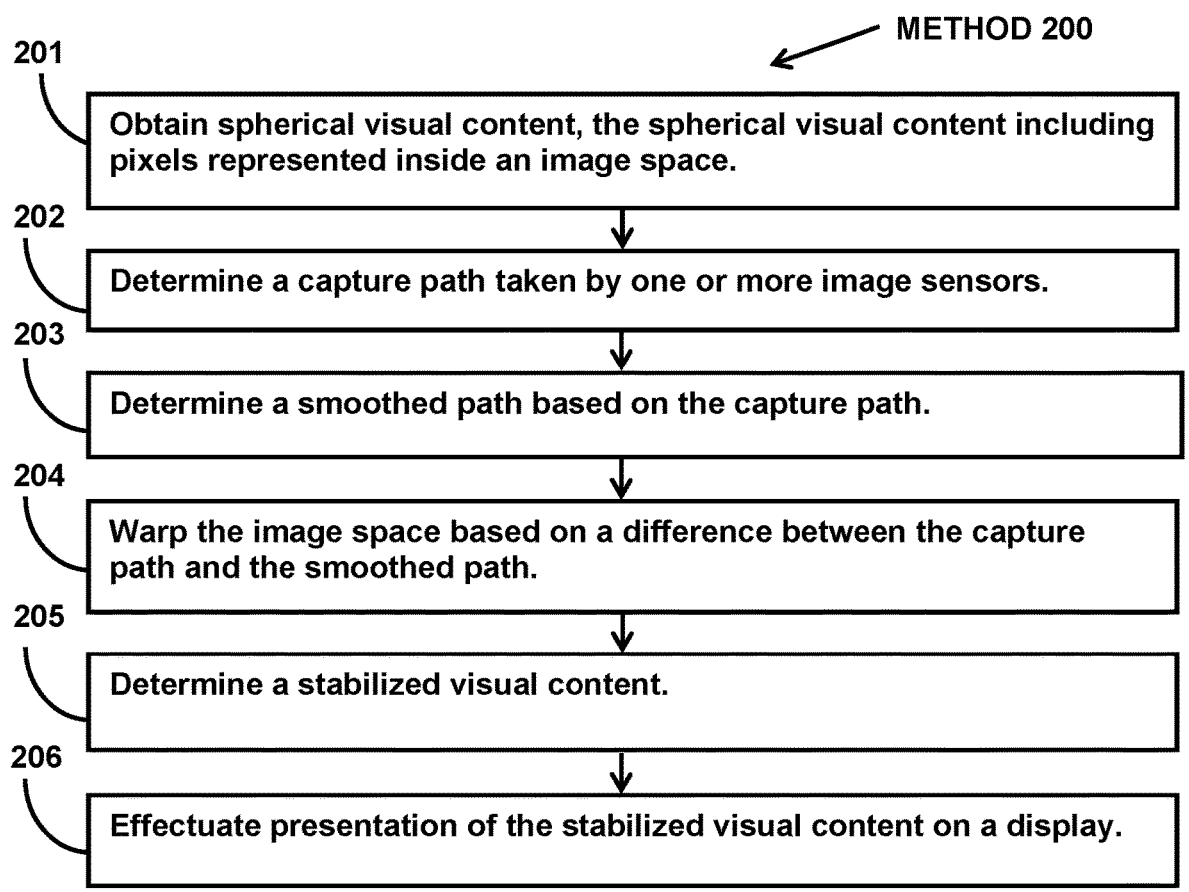
FIG. 2 illustrates a method for generates stabilized visual content using spherical visual content.

FIG. 2 illustrates method 200 for generating stabilized visual content using spherical visual content. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, spherical visual content may be obtained. The spherical visual content may include pixels represented inside an image space. In some implementations, operation 201 may be performed by a processor component the same as or similar to spherical visual content component 102 (shown in FIG. 1 and described herein).

At operation 202, a capture path taken by one or more image sensors may be determined. In some implementations, operation 202 may be performed by a processor component the same as or similar to capture path component 104 (shown in FIG. 1 and described herein).

At operation 203, a smoothed path may be determined based on the capture path. In some implementations, operation 203 may be performed by a processor component the same as or similar to smoothed path component 106 (shown in FIG. 1 and described herein).

At operation 204, the image space may be warped based on a difference between the capture path and the smoothed path. In some implementations, operation 204 may be performed by a processor component the same as or similar to warp component 108 (shown in FIG. 1 and described herein).

At operation 205, a stabilized visual content may be determined. In some implementations, operation 205 may be performed by a processor component the same as or similar to stabilized visual content component 110 (shown in FIG. 1 and described herein).

At operation 206, presentation of the stabilized visual content on a display may be effectuated. In some implementations, operation 206 may be performed by a processor component the same as or similar to display component 112 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for generating changed visual content using spherical visual content, the system comprising:
one or more physical processors configured by machine readable instructions to:
obtain the spherical visual content, the spherical visual content captured by one or more image sensors during a time duration, the spherical visual content including pixels represented in an image space, the image space including a projection point inside the image space, wherein the spherical visual content is transformed into a spherical projection space by projecting the pixels in the image space to the spherical projection space along lines including the projection point;
determine a capture path taken by the one or more image sensors during the time duration, the capture path reflecting positions and orientations of the one or more image sensors during the time duration, the capture path including capture viewpoints from which the one or more image sensors captured the spherical visual content during the time duration, the capture path including a first capture viewpoint from which the spherical visual content was captured at a first point in time within the time duration;
determine a changed path based on the capture path, the changed path including changed viewpoints, the changed path including a first changed viewpoint at the first point in time within the time duration, the first capture viewpoint different from the first changed viewpoint;
warp the image space based on a difference between the capture path and the changed path, the difference between the capture path and the changed path including a difference between the positions of the first capture viewpoint and the first changed viewpoint at the first point in time;
determine the changed visual content by projecting the spherical visual content represented in the warped image space to the spherical projection space, wherein views of the changed visual content appear to be from the changed viewpoints such that a view of the changed visual content corresponding to the first point in time appears to be from the first changed viewpoint; and
effectuate presentation of the changed visual content on a display.

2. The system of claim 1, wherein the projection point coincides with a center of the spherical visual content represented in the image space.

3. The system of claim 1, wherein the changed path has smoother changes in the positions and/or the orientations than the capture path.

4. The system of claim 3, wherein the changed path having smoother changes in the positions and/or the orientations than the capture path is characterized by the changed path having less jitters in the positions and/or the orientations than the capture path.

5. The system of claim 1, wherein the presentation of the changed visual content on the display includes playback of the changed visual content at a play rate faster than a capture rate at which the one or more image sensors captured the spherical visual content for at least a portion of the time duration.

6. The system of claim 1, wherein the changed viewpoints include a viewing field of view and a viewing rotation of the changed visual content, and the presentation of the changed visual content on the display includes playback of portions of the changed visual content corresponding to the viewing field of view and the viewing rotation of the changed visual content.

7. The system of claim 1, wherein the capture path taken by the one or more image sensors during the time duration is determined based on an analysis of the spherical visual content and/or motion and orientation information for the one or more image sensors, the motion and orientation information for the one or more image sensors generated by a motion and orientation sensor.

8. The system of claim 1, wherein warping the image space includes warping the image space for a portion of the time duration.

9. The system of claim 1, wherein the one or more image sensors are carried by an unmanned aerial vehicle.

10. A method for generating changed visual content using spherical visual content, the method performed by a computing system including one or more processors, the method comprising:

obtaining, by the computing system, the spherical visual content, the spherical visual content captured by one or more image sensors during a time duration, the spherical visual content including pixels represented in an image space, the image space including a projection point inside the image space, wherein the spherical visual content is transformed into a spherical projection space by projecting the pixels in the image space to the spherical projection space along lines including the projection point;

determining, by the computing system, a capture path taken by the one or more image sensors during the time duration, the capture path reflecting positions and orientations of the one or more image sensors during the time duration, the capture path including capture viewpoints from which the one or more image sensors captured the spherical visual content during the time duration, the capture path including a first capture viewpoint from which the spherical visual content was captured at a first point in time within the time duration;

determining, by the computing system, a changed path based on the capture path, the changed path including changed viewpoints, the changed path including a first changed viewpoint at the first point in time within the time duration, the first capture viewpoint different from the first changed viewpoint;

warping, by the computing system, the image space based on a difference between the capture path and the changed path, the difference between the capture path and the changed path including a difference between the positions of the first capture viewpoint and the first changed viewpoint at the first point in time;

determining, by the computing system, the changed visual content by projecting the spherical visual content represented in the warped image space to the spherical projection space, wherein views of the changed visual content appear to be from the changed viewpoints such that a view of the changed visual content corresponding to the first point in time appears to be from the first changed viewpoint; and effectuating, by the computing system, presentation of the changed visual content on a display.

11. The method of claim 10, wherein the projection point coincides with a center of the spherical visual content represented in the image space.

12. The method of claim 10, wherein the changed path has smoother changes in the positions and/or the orientations than the capture path.

13. The method of claim 12, wherein the changed path having smoother changes in the positions and/or the orientations than the capture path is characterized by the changed path having less jitters in the positions and/or the orientations than the capture path.

14. The method of claim 10, wherein the presentation of the changed visual content on the display includes playback of the changed visual content at a play rate faster than a capture rate at which the one or more image sensors captured the spherical visual content for at least a portion of the time duration.

15. The method of claim 10, wherein the changed viewpoints include a viewing field of view and a viewing rotation of the changed visual content, and the presentation of the changed visual content on the display includes playback of portions of the changed visual content corresponding to the viewing field of view and the viewing rotation of the changed visual content.

16. The method of claim 10, wherein the capture path taken by the one or more image sensors during the time duration is determined based on an analysis of the spherical visual content and/or motion and orientation information for the one or more image sensors, the motion and orientation information for the one or more image sensors generated by a motion and orientation sensor.

17. The method of claim 10, wherein warping the image space includes warping the image space for a portion of the time duration.

18. The method of claim 10, wherein the one or more image sensors are carried by an unmanned aerial vehicle.

19. A system for generating changed visual content using spherical visual content, the system comprising:

one or more physical processors configured by machine readable instructions to:

obtain the spherical visual content, the spherical visual content captured by one or more image sensors during a time duration, the spherical visual content including pixels represented in an image space, the image space including a projection point inside the image space that coincides with a center of the spherical visual content represented in the image space, wherein the spherical visual content is transformed into a spherical projection space by projecting the pixels in the image space to the spherical projection space along lines including the projection point;

determine a capture path taken by the one or more image sensors during the time duration, the capture path reflecting positions and orientations of the one or more image sensors during the time duration, the capture path including capture viewpoints from which the one or more image sensors captured the spherical visual content during the time duration, the capture path including a first capture viewpoint from which the spherical visual content was captured at a first point in time within the time duration;

determine a changed path based on the capture path, the changed path having smoother changes in positions and/or orientations than the capture path, the changed path including changed viewpoints, the changed path including a first changed viewpoint at the first point in time within the time duration, the first capture viewpoint different from the first changed viewpoint, wherein the changed path having smoother changes in the positions and/or the orientations than the capture path is characterized by a maximum rate of changes in the positions and/or the orientations of the changed path being smaller than a maximum rate of changes in the positions and/or the orientations of the capture path and the changed path having less jitters in the positions and/or the orientations than the capture path;

warp the image space based on a difference between the capture path and the changed path, the difference between the capture path and the changed path including a difference between the positions of the first capture viewpoint and the first changed viewpoint at the first point in time;

determine the changed visual content by projecting the spherical visual content represented in the warped image space to the spherical projection space, wherein views of the changed visual content appear to be from the changed viewpoints such that a view of the changed visual content corresponding to the first point in time appears to be from the first changed viewpoint; and effectuate presentation of the changed visual content on a display, wherein the presentation of the changed visual content on the display includes playback of the changed visual content at a play rate faster than a capture rate at which the one or more image sensors captured the spherical visual content for at least a portion of the time duration.

20. The system of claim 19, wherein the one or more image sensors are carried by an unmanned aerial vehicle.

* * * * *